June 19, 1962 W. H. KUNZ 3,040,222
SERVOSYSTEM ADAPTED FOR ANGULAR MEASUREMENT
Filed Oct. 28, 1955 4 Sheets-Sheet 1

INVENTOR.
WALDEN H. KUNZ
BY
William R. Lane
ATTORNEY

June 19, 1962 W. H. KUNZ 3,040,222
SERVOSYSTEM ADAPTED FOR ANGULAR MEASUREMENT
Filed Oct. 28, 1955 4 Sheets-Sheet 2

*INVENTOR.*
WALDEN H. KUNZ
BY
ATTORNEY

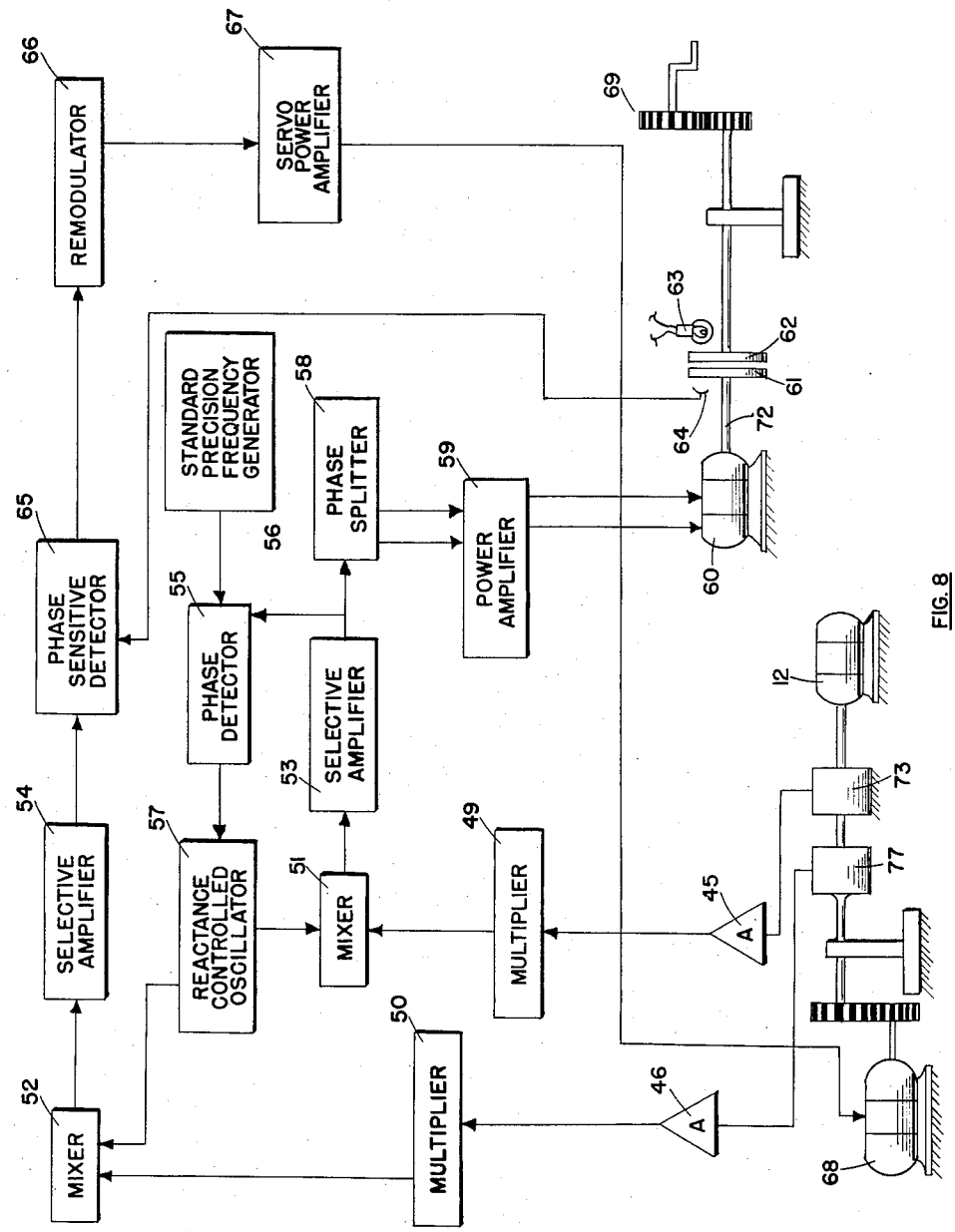

United States Patent Office 3,040,222
Patented June 19, 1962

3,040,222
SERVOSYSTEM ADAPTED FOR ANGULAR MEASUREMENT
Walden H. Kunz, Downey, Calif., assignor to North American Aviation, Inc.
Filed Oct. 28, 1955, Ser. No. 543,445
18 Claims. (Cl. 318—32)

The present invention is directed to means for determining relative angularity between two relatively rotatable elements. More particularly, the invention concerns a transducer device employing the statistical principles of averaging time and space so as to increase accuracy and stability. The device is usable generally for measuring angles to a high degree of accuracy.

Various means such as resolvers, etc., have been constructed for measuring angles. These devices are considerably less accurate than the herein disclosed device. Optical spot checking, one of the most accurate of prior methods of angular measurement, is laborious and time consuming. The accuracy of resolvers is generally on the order of several seconds of arc; of protractors, 2 minutes of arc; of optical spot checkers, one second of arc. The apparatus of the present invention provides an automatic, rapid, and continuous method of angular measurement having an accuracy better than one second of arc.

The angle measuring means of this invention may be used as the error sensing and controlling elements of a servomechanism wherein it is desired to rotate a shaft through an accurately controlled angle or at an accurately controlled angular velocity. In such an application, the controlling element can be separated from the driving element and accuracy is not reduced by wear in the driving element. Thus, relatively low precision gears can be used to provide a high precision drive system. As set out above, the device may be used to determine how much angular rotation of a shaft has taken place. The output shaft may rotate a synchro, resolver, prism, mirror, or potentiometer as required in precision testing and measuring instruments, electromechanical analog computers, and other commercial mechanisms. The device may also function as a gear calibrator for rapidly measuring and recording the error envelope of a gear, gear train, or lead screw.

The problem of making very accurate angular measurements is a problem common to all measuring instruments. Thus, an instrument for measuring lengths no matter how accurately made will still have a limit of accuracy beyond which it cannot go. This means that no measurement is ever exactly and entirely accurate save by chance, the latter situation being somewhat anomalous in that there is no way of ascertaining that such a measurement is exactly accurate. Similarly, an instrument for measuring angles will have a limit to its accuracy. Accordingly, a protractor is only as accurate as the angular markings placed thereon.

A high resolution angle measuring device capable of an accuracy better than 1 second of arc, requires a scale having a plurality of very precisely located markings. This invention recognizes the fact that no matter how careful or precise such a scale is constructed, errors in positioning the marks are inevitable. These errors, however, are subject to the peculiarity that some of the markings will be placed to one side of the true position, whereas other markings will be placed to the other side of the true position, i.e., some of the errors will be positive and some negative. Statistical theory teaches that these errors will tend to balance each other, so that if enough measurements are made, the errors will disappear on the average. A further study of these errors has shown them to be distributed in what is known as a normal or Gaussian distribution. The normal distribution is defined by the curve which results when the binomial $(p+q)^n$ is raised to an infinitely high power and the constants $p$ and $q$ each equal ½. This curve is entirely symmetrical bilaterally with a high point exactly at the center, indicating that the largest number of markings fall at or near the true position with, however, some markings having errors on each side of the true position. The significance of the normal curve as applied to angle measuring is that the angular spacing of individual scale markings is open to question because of error in their placement. However, if a means is devised to space average the angular spacing of a plurality of markings for each individual measurement, the resultant measurement is considerably more accurate than if the angular spacing of individual markings were utilized for the angular measurement.

A preferred embodiment of the present invention comprises reference and displaceable elements, the displaceable element being movable through an angular displacement relative to the reference element. In one form of the invention these elements comprise stationary and rotatable members having a plurality of optical grating lines. The random errors which occur in positioning each individual grating line are averaged in applicant's invention. These optical gratings in combination with suitable light sources simultaneously produce a plurality of light rays each of which is indicative of the angular spacing of different ones of the grating lines. The plurality of light rays in both the reference and displaceable elements energize photosensitive devices located in the respective elements. The outputs of these photosensitive devices comprise the output signals from the reference and displaceable elements, the signals being generated not by the angular spacing of individual grating lines, but by the average of the angular spacing of a plurality of optical grating lines. The principles of statistics enumerated above are then applicable with the result that the random errors in the angular spacing of individual grating lines tend to cancel each other out. As explained hereinafter, this averaging in space is further enhanced by time averaging so as to provide a very precise indication of the relative angular displacement between the reference and the displaceable elements.

An object, therefore, of this invention is to provide an accurate angle measuring device.

A further object of this invention is to provide a device capable of accurately measuring angular movement.

Another object of this invention is to provide a device capable of indicating precise angular positioning.

A still further object of this invention is to provide a transducer utilizing space averaging to detect angular displacements.

A further object of this invention is to provide an angle measuring device utilizing time and space averaging.

An additional object of this invention is to provide an apparatus coupled with an electrical circuit to accurately measure angles and angular motion.

The above objects as well as other objects of this invention will become apparent from the following description taken in connection with the accompanying drawings in which:

FIG. 8 is a precise angle positioning drive utilizing the reluctance transducer.

Figure 1:
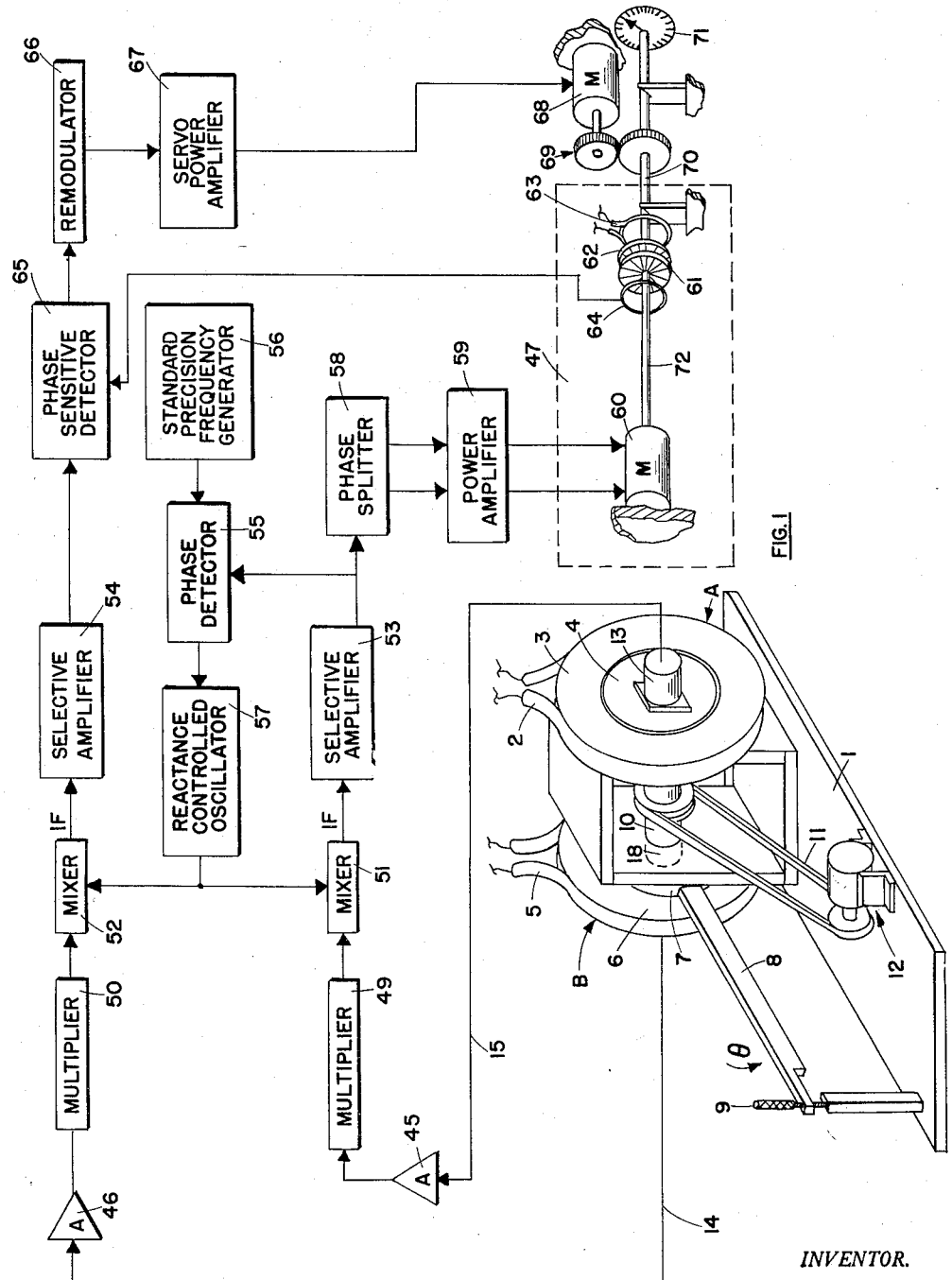
FIG. 1 represents an operating model of the optical transducer and a block circuit diagram of an accompanying electrical circuit indicating angular displacement between relatively movable elements.

The overall device illustrated in FIG. 1 measures and indicates angular displacement by a method of time and space averaging. In the case of the illustrated optical transducer, information of relative angular displacement of two concentric circular gratings is transmitted as a phase displacement between optical carriers generated by passing separate beams of light through the respective gratings and then separately through similar coaxial gratings rotating at equal rates. In FIG. 1, the first-mentioned grating is termed the "displaceable grating" means and is denoted by reference character B, while the latter similar grating is denoted as reference grating means A. The frequencies of the generated carriers are equal though not necessarily constant. The phase angle between the carriers is a linear function of the angular displacement of the displaceable grating.

If the gratings are not rotating with respect to each other, an electrical signal from respective photocells indicates the total amount of light allowed to pass through respective gratings and, therefore, is produced by the arithmetic sum of the individual, random optical carriers, or rays. It has been found desirable that the width of the grating lines, or grooves, be slightly greater than the surfaces between grooves. A grating has, of course, hundreds of lines to the inch. As heretofore noted, random errors in the location of individual lines of the grating occur as a frequency distribution known in the field of statistics as a normal or Gaussian distribution. A discussion of this type of statistical distribution appears in chapter 5 of Dixon and Massey, "Introduction to Statistical Analysis." As each inner grating rotates relative to its outer grating, the light rays passing from the light source to the photo-cell are periodically interrupted by the coaction of the optical gratings. It is believed that the electrical signal produced by the photo-cells in response to the periodically interrupted light rays impinging thereon represents the mean of the values under the Gaussian curve. That is, the electrical signal is caused not by a light ray generated by the location of individual grating lines on the inner and outer optical gratings, but rather the electrical signal is generated by a plurality of light rays each of which is indicative of the angular spacing of individual grating lines on the inner and outer optical gratings. Stated in another way, the plurality of periodically interrupted light rays represent a plurality of pulse trains, the position of the pulses in said pulse trains being indicative of the spatial position of either the reference or the displaceable element. The photo cell provides a means for converting the plurality of pulse trains to a single pulse train which represents the space averaged position of either the reference or the displaceable element. Since the electrical signal is generated by the coaction of the inner and outer optical gratings, the particular phase of the electrical signal is dependent upon the relative location of the outer grating with respect to the inner grating. Since the inner rotating gratings are maintained fixed relative one with the other, the electrical signal generated by the displacement element will have a phase different from that of the reference element when the outer grating of the displacement element is angularly displaced with respect to the outer grating of the reference grating. The electrical signal from each photosensitive device is sent to a suitable band pass filter and then compared in a phase detector hereinafter described. This provides a signal indicating the relative phase displacement between the two outer gratings. The accuracy of the signal indicating relative angluar displacement of the two outer gratings is enhanced by both time and space averaging. Space averaging is achieved because at any instant of time, the output signal from a photo-cell represents the sum of a plurality of generated signals, the total signal therefore being an average of the light rays passed by all the grating lines. Time averaging is obtained by providing a high repetition rate, the output signal being an average of the signals generated over a period of time. The latter effect is further enhanced by the finite response time of the servo loop hereinafter described.

The optical device in FIG. 1 comprises a base support 1 upon which the reference grating means A and displaceable grating means B are mounted. The reference grating A comprises a circular tubular light source 2, mounted around the periphery of a translucent, stationary grating disc 3. Concentrically mounted within said disc 3 is a rotatable grating disc 4. The displaceable side of the optical transducer device likewise comprises a circular tubular light source 5, extending around the periphery of a translucent disc 6, which, in turn, is concentrically mounted around the rotatable grating disc 7. The disc 6 is attached to a lever arm 8 and a lever movement means 9. The lever 8 and means 9 is used to angularly displace the disc 6 through an angle θ with respect to disc 7. The inner discs 4 and 7 are driven by a shaft 10 rotated by a drive belt 11 and motor 12. Photoelectric cells 13 and 18 are provided on the reference means and displaceable means A and B, respectively, to pick up light pulses which have passed radially through the grating discs. These light pulses are converted into electric energy in the photoelectric cells and leave the transducer device as signals on lines 14 and 15. The signals have a phase displacement equal to the amount of angular displacement of the disc 6 relative to disc 3 as set by the displacement lever 8 and lever movement means 9.

Figure 2:
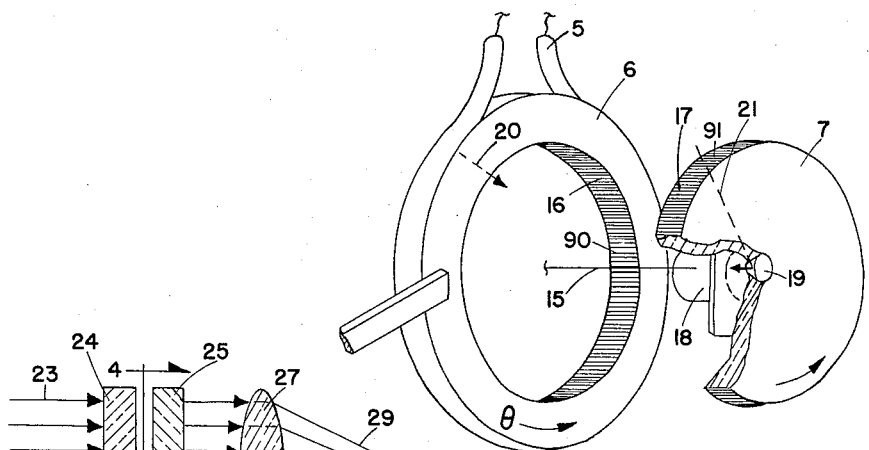
FIG. 2 is an exploded cut-away view of a portion of the optical device of FIG. 1.

FIG. 2 is an exploded view of the displaceable grating means B shown in FIG. 1. The inner perimeter of the displaceable disc 6 contains numerous surfaces 90 separated by close equidistant and parallel lines 16, constituting a grating. Inner rotatable disc 7 contains peripheral surfaces 91 separated by numerous close equidistant and parallel lines 17 constituting a grating which, in operation, lie in juxtaposition with lines 16. Light rays 20 pass radially through the disc 6, grating lines 16, and grating lines 17. The steady light rays 20 passing through the grating element 16 result in a pulsating series of light rays 21 passing through disc 7. The pulsation is due to the continual rotation of such disc. The light rays 21 are redirected by the conical prism 19 to the photoelectric cell 18 which gives out a fluctuating, or varying electrical signal on line 14 proportional to the modulated light rays. It will be evident that the phase of the modulated signal 14 is determined by the location of surfaces 90 in relation to surfaces 91, for example, when the surfaces 90 and 91 are in registration a maximum amount of light is permitted to pass through the respective gratings, at which time the photoelectric cell output will be a maximum. Thus, the phase of the electrical signal on line 14 may be varied by changing the relative position of surfaces 90 with respect to surfaces 91. The reference means A, FIG. 1, of the optical transducer has a similar construction as that illustrated in FIG. 2 except for the fact that disc 3, in that embodiment, is stationary rather than displaceable as is disc 6. Thus if the signal from the photoelectric cell 13 in reference means A is used as a reference, the angular displacement of displaceable means B relative to the reference means A will be represented by a phase difference between the signal outputs of photoelectric cells 13 and 18.

Figure 3:
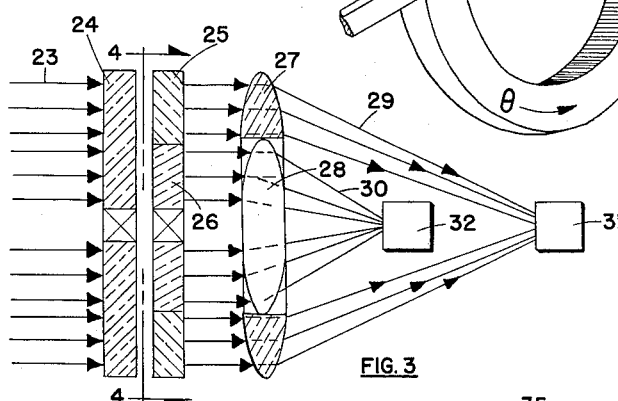
FIG. 3 is a cross-section of a modification of the device.
Figure 4:
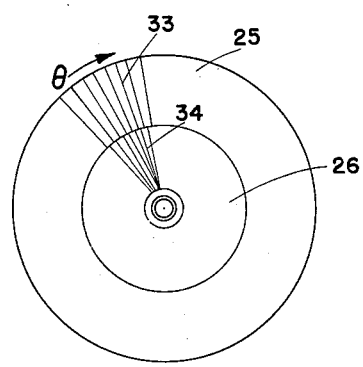
FIG. 4 is a view taken on the lines 4—4 of FIG. 3.

FIGS. 3 and 4 illustrate a modification of the transducer device. In this modification, the circular gratings are radially subscribed on the disc rather than cylindrically as in FIGS. 1 and 2. Parallel light rays 23 from a remote or collimated source, pass through a rotatable disc 24 on which are inscribed radial gratings. Adjacent to and coaxial with disc 24 are a stationary inner disc 26 and a displaceable disc 25. The grating disc 25 is rotated the amount of the desired input angle about the common axis of the system. As seen in FIG. 4, the displaceable disc 25 has radial grating lines 33 thereon which, when the disc is displaced, are rotated an angle $\theta$ with respect to the grating lines 34 on the stationary disc 26. Light passing through the revolving disc 24 and the disc 26 is focused on a photoelectric cell 32 by the condensing lens 28. Likewise, light passing through the outer part of disc 24 and passing through displaceable disc 25 is concentrated on photoelectric cell 31 by the annular condensing lens 27. Rays 29 and 30 denote the passage of light rays to the respective photoelectric cells 31 and 32. The phase of the two electrical waves, or signals, emerging from the photoelectric cells 31 and 32 will differ as a function of the angle of rotation of the disc 25 with respect to disc 26.

Figure 5:
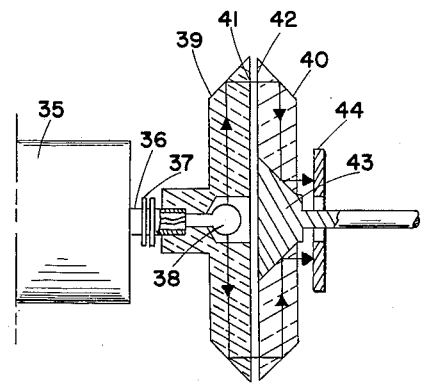
FIG. 5 is a further modification of one-half of an optical transducer.

FIG. 5 illustrates a further modification of an optical transducing device usable in the present invention. The motor 35 is provided to drive a shaft 36 and a rotatable disc 39. A slip ring connection 37 is provided to provide power for a light source 38 which is adapted to shine radially through the disc member 39. The peripheral edge of disc 39 is beveled at a 45° angle in order to reflect light from the source 38 to a direction at right angles to the disc member 39. In juxtaposition with the disc member 39 is a stationary disc member 40 having a reversely-beveled surface and having a conical reflecting member 43 in the center thereof to redirect the light rays from the beveled surface to an annular photocell 44. Radial grating lines 41 and 42 are provided on the nearly-abutting surfaces of the disc 39 and 40 to cooperate in essentially the same manner as illustrated in FIGS. 3 and 4. It is to be understood that FIG. 5 illustrates a displaceable transducer device analogous to the transducer B shown in FIG. 2. A duplicate pair of discs and photocells corresponding to transducer A of FIG. 1 will be located, for example, on the remaining side of motor 35 and driven thereby to act as a reference means. Disc 40 is adapted to be rotated through the angle to be measured thus forming the displaceable grating means. Electrical signals corresponding to the signal on lines 14 and 15 (FIG. 1) are emitted from the photocells on each side of motor 35.

The electrical signals from photosensitive devices 13 and 18, FIG. 1, are received respectively by amplifiers 45 and 46, and are then sent to multipliers 49 and 50, mixers 51 and 52, and selective amplifiers 53 and 54. The aforementioned circuits may be those conventionally found in communication circuits. For example, the selective or tuned type of amplifier is described in Terman, "Radio Engineer's Handbook," pp. 434–438. Phase detector 55 receives signals from selective amplifier 53 and standard precision frequency generator 56 and provides a D.-C. output to control the frequency of reactance-controlled oscillator 57, which provides the local frequency for mixers 51 and 52. The last named circuits are conventionally used in communication and servo control circuitry. A representative phase detector circuit is shown in the "Radiation Laboratory Series," volume 20, p. 156, FIGS. 6–20. A conventional reactance-controlled oscillator is described on pp. 654–656 and illustrated in FIG. 22c on p. 655 of Terman, supra. The signals received by amplifiers 53 and 54 are, then, intermediate frequency signals. A phase splitter 58 receives the signal from selective amplifier 53 and provides two output voltages displaced in phase. Two voltages in quadrature phase relationship are conventionally obtained from a resistance-capacitance network. This type of circuit is described and illustrated in "Principles of Radar," second edition, pp. 3–30 to 3–32 and FIG. 16. The output of the phase splitter 58 drives power amplifier 59, circuits 58 and 59 in combination providing a two-phase power source for driving two-phase motor 60. In operation, motor 60 is driven at a fixed frequency determined by, say, the intermediate frequency of 400 cycles. Disc 61 has a number of ruled lines thereon and is caused to rotate by motor 60. Alternately, disc 61 may merely be a polarized lens if motor 60 turns at sufficient speed. Adjacent to disc 61 is disc 62 with a similar number of ruled lines, or a polarized lens if disc 61 is polarized. Lamp 63 provides light through discs 61 and 62 to photoelectric cell 64, which provides a signal at the intermediate frequency of the system, such as amplified by selective amplifier 53. The discs 61 and 62 have areas of light transmissibility and nontransmissibility as they rotate with respect to each other providing the signal to cell 64. This signal is sent from photoelectric cell 64 to phase sensitive detector 65 at which point it is compared in phase with the signal from selective amplifier 54. Phase sensitive detector 65 may be similar in circuitry to phase detector 55. The combination of motor 60, discs 61 and 62, lamp 63, and photocell 64 provides a phase shifter which is conveniently controlled by controlling the rotation of disc 62. The D.-C. error signal from phase sensitive detector 65 is modulated in remodulator 66. Remodulator 66 may be any type of modulator used in servo control circuits, the main requirement being that its A.-C. output indicates the sense as well as the magnitude of the input D.-C. error signal. This type of modulator is discussed in the "Radiation Laboratory Series," volume 21, section 12.11 beginning on p. 378. Servo power amplifier 67 amplifies the modulated signal and drives a conventional servo motor 68. Motor 68 drives disc 62 through gear train 69 and shaft 70. At the other end of shaft 70 is an indicator 71. It may be noted that phase sensitive detector 65, remodulator 66, servo power amplifier 67, motor 68, discs 61 and 62, photoelectric cell 64, and indicator 71 constitute a closed loop servo system. This type of servo system is illustrated in block diagram form in FIG. 9.3, p. 233 of the "Radiation Laboratory Series," volume 21, this figure including an error detector, controller, and output or controlled member. In the present invention, discs 61 and 62, photoelectric cell 64, and phase sensitive detector 65 function as an error detector, remodulator 66, servo power amplifier 67 and motor 68, constitute a controller, and indicator 71 constitutes an output or controlled member. In another mode of explanation, the signal from the reference grating means A undergoes a phase shift in the apparatus including motor 60, discs 61 and 62, lamp 63 and photoelectric cell 64. The phase difference between this phase-shifted signal and the signal from displaceable grating means B is compared in phase sensitive detector 65, the output of phase sensitive detector 65 in turn controlling the phase shift of the signal generated in reference grating means A.

The closed loop feedback circuit of selective amplifier 53, phase detector 55, and oscillator 57 is provided for the purpose of excluding the system errors arising in the electronic paths, such as drift in oscillator, amplifier or mixer. Phase is defined as the time integral of frequency when the amplitude of the variable phase signal changes only a small percentage during a cycle. Since the output signals from the optical transducer have relatively constant magnitudes, the above condition is met; therefore, any variation in phase caused by drift in the electronic components composing the closed loop feedback circuit may be canceled by varying the frequency output of the reactance controlled oscillator. Phase detector 55 and oscillator 57 also provide a means for maintaining a constant intermediate frequency (IF) through selective amplifiers 53 and 54. Selective amplifier 53 is a high-Q, tuned amplifier and any deviation of frequency received from mixer 51 (caused, for example, by disc 4 changing in speed) is detected and phase detector 55 provides a signal to change the oscillatory frequency whereby the intermediate frequency passing from mixer 51 to amplifier 53 returns to a correct, fixed value. At the same time, the corrected oscillator frequency is sent to mixer 52, resulting in the correct intermediate frequency being received at amplifier 54. Phase-sensitive detector 65 receives a signal from photoelectric cell 64 and compares it with the output of the displaceable means B, which signal is received from selective amplifier 54; and, if these two signals are out of phase, detector 65 causes motor 68 to rotate and indicator 71 to deflect according to the amount of difference in phase between these two signals. Again, in explanation, the device of FIG. 1 provides a rotation of shaft 72 at a fixed speed. Any variation from fixed frequency by the output of photoelectric cell 13 is detected and corrected in the intermediate frequency stage. The intermediate frequency of the output of photocell 18 is changed a like amount. Phase-sensitive detector 65 compares the phase of the signal from photocell 64 with the phase of the corrected intermediate frequency signal from the output of photocell 18 and deflects indicator 71 accordingly. Thus, the angular measuring system shown in FIG. 1 measures a difference in phase caused by a displacement of disc 6 in relation to disc 3, other phase variations due to drift in the electronic components or introduced by frequency variations in the electronic or mechanical elements being reduced to a minimum by the IF stages in combination with the closed loop feedback circuit.

Figure 6:
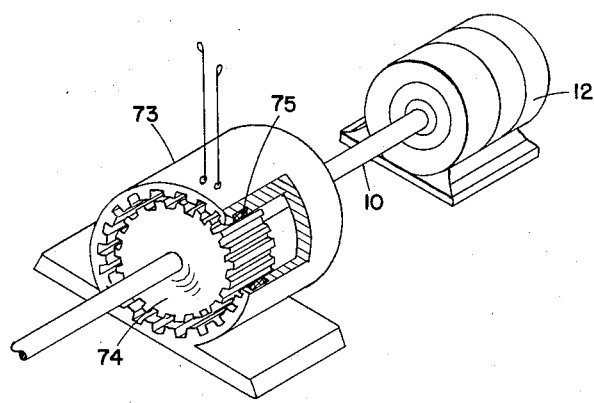
FIG. 6 is a reluctance type embodiment of the transducer portion of the invention.

FIG. 6 illustrates the reluctance embodiment of the device in which motor 12, drive shaft 10, upon which is mounted an internal ring-type gear or toothed casing 73 and toothed wheel 74, similar to a spur gear. A winding 75 is embedded around the internal surface of casing 73. As the surfaces of the teeth of toothed wheel 74 lie in registration with the teeth of housing 73, the reluctance of the flux path encircling coil 75 is reduced. As the surfaces of the teeth of wheel 74 move apart from the teeth of housing 73, the reluctance of the path is increased. This is similar to the registration of surfaces of the optical device described previously. If there is any residual magnetism in the wheel 74 or housing 73, a small signal current will be induced in winding 75 as wheel 74 rotates.

The Gaussian distribution curve spoken of in the optical embodiment of this device is obtained in the reluctance embodiment as well, if numerous teeth are provided on each element, that is, on the order of fifty or more. It has been found that 720 teeth reduce the error of measurement one-twentieth. During the production of the toothed wheel 74 and the housing 73, certain random errors in the location of each specific tooth occur; however, the output signal generated depends on the average of all the locations and, therefore, provides the same Gaussians distribution as described previously. One basic concept of the device, therefore, is to include a sufficient number of indicial surfaces spaced apart to provide a Gaussian distribution in the output signal.

Figure 7:
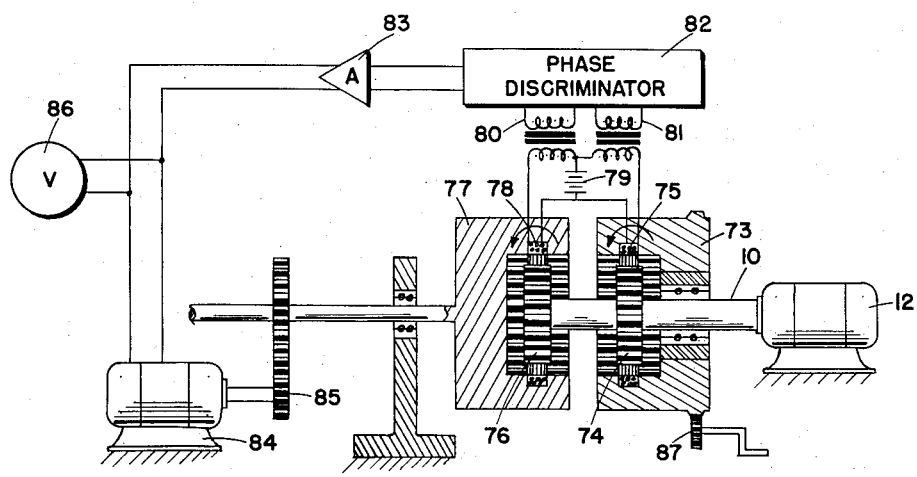
FIG. 7 is an angle follower servo loop using the reluctance transducer.

FIG. 7 illustrates the use of the reluctance device as an error detector in servo-controlling an output shaft. Spur gear wheels 74 and 76 which, as a matter of fact, may be a single, wide gear, are located within internal ring gears 73 and 77. The reluctance path around coils 75 and 78 is as illustrated by the arrows and is modulated by the rotation of gears 74 and 76. With no residual magnetism, a D.-C. source 79 must be provided. Transformers 80 and 81 drive the phase discriminator 82 according to the phase difference between the two frequencies received from windings 75 and 78. It will be noted that housing 73 may be fixed or rotatable and housing 77 is rotatable. If housing 77 is relatively displaced with respect to housing 73, the phase of the signals through transformers 80 and 81 are different, and discriminator 82 provides an output to amplifier 83 to drive motor 84, gear train 85 and rotate housing 77 to follow housing 73. Voltmeter 86 indicates the amount of displacement between housing 77 and 73. A gear adjustment 87 of housing 73 may be used and housing 77 will follow the adjustment of housing 73.

Suppose the accurate angle capabilities of the device is used to grind gears accurately. A gear blank might be attached to be rotated by housing 77. As the blank is caused to rotate to each succeeding tooth-cutting position, by cranking gear 87, an accurate positioning of the blank is obtained which is greater than the accuracy of any of the gears 74, 76, or internal gears of housings 73 and 77.

FIG. 8 is an illustration in which angle rotation is cranked into the system by gears 69 and housing 77 is made to rotate a precise angle from housing 73 which is fixed in this embodiment. Noting the similarity to FIG. 1, FIG. 8 uses the reluctance device substituted for the optical device illustrated in FIG. 1, and locates motor 68 to drive element 77 which corresponds to displaceable element 6 in FIG. 1. In effect, then, over FIG. 1, applicant selects the angle desired by gear train 69 and the displaceable element follows accordingly.

Using either of the two embodiments, the reluctance device or the optical device, accurate angular positioning of shafts may be either produced or indicated. The transducer portion is a precise error indicator which allows accuracies beyond normal capabilities. Due to the accuracies obtainable, multiplication is conveniently achieved. A small rotation of gears 69 in FIG. 8 may be scaled to produce a large rotation by motor 68 and element 77. In FIG. 1, a small displacement by element 6 may be scaled to cause indicator 71 to rotate a large amount.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Angle indicating means comprising a reference element having a plurality of uniformly spaced surfaces circularly disposed thereon, an angularly displaceable element having a plurality of uniformly spaced surfaces circularly disposed thereon, a rotating element having a plurality of uniformly spaced surfaces circularly disposed thereon, said rotating element disposed in proximity to said reference element and said displaceable element, means for generating an electrical signal varying as a function of registration between said surfaces of said rotating element and said surfaces of said reference element, and means for generating an electrical signal varying as a function of registration between said surfaces of said rotating element and said surfaces of said displaceable element.

2. The combination recited in claim 1 wherein is included means for shifting the phase of one of said generated signals, and means for determining the phase difference between said phase-shifted signal and the other of said generated signals.

3. The combination recited in claim 1 wherein is included phase-shifting means for shifting the phase of one of said generated signals, and closed loop servo means for controlling the output of said phase-shifting means comprising phase-detecting means for determining the phase difference between the output of said phase-shifting means and the other of said generated signals, and means connecting the output of said phase-detecting means with said phase-shifting means whereby the output of said phase-shifting means is controlled by the output of said phase-detecting means.

4. Angle-indicating means comprising a reference element having numerous, uniformly spaced surfaces circularly disposed thereon, an angularly displaceable element having numerous, uniformly spaced surfaces circularly disposed thereon, a rotating element having numerous, uniformly spaced surfaces circularly disposed thereon, said rotating element being coaxially mounted with respect to said displaceable element, said rotating element disposed in a location so as to place the surfaces thereof in juxtaposition with the surfaces of said reference element and said displaceable element, means for generating an electrical signal varying according to the mean of the values of the Gaussian distribution of the individual surface positions of said rotating element with respect to said reference element, means for generating an electrical signal varying according to the mean of the values of the Gaussian distribution of individual surface positions of said rotating element and said displaceable element.

5. Angle-indicating means comprising a reference element having a plurality of uniformly spaced teeth circularly disposed thereon, an angularly displaceable element having a plurality of uniformly spaced teeth circularly disposed thereon, a rotating element having uniformly spaced teeth circularly disposed thereon, said rotating element axially disposed at a location so that the teeth thereof pass in juxtaposition with the teeth of said reference element and said displaceable element, means for generating an electrical signal varying according to the change in reluctance as the teeth of said rotating element move with respect to the teeth of said reference element, means for generating an electrical signal varying according to the change in reluctance as the teeth of said rotating element move with respect to the teeth of said displaceable element.

6. Angle-indicating means comprising a reference element having a plurality of uniformly spaced teeth circularly disposed thereon, and a winding embedded in the general circular location of said teeth, an angularly displaceable element having a plurality of uniformly spaced teeth circularly disposed thereon and having a winding embedded in the general circular location of said teeth, a rotating element having uniformly spaced teeth circularly disposed thereon, said rotating element axially disposed so that the teeth thereof rotate in juxtaposition with the teeth of said reference element and said displaceable element, the teeth of said rotating element varying the reluctance of the magnetic path around the embedded windings of said reference element and said displaceable element, means for creating a magnetic field around said windings, means for determining the phase difference between the output signals of said windings.

7. The combination recited in claim 6 wherein it is included means for driving said displaceable element according to the output of said means for determining the phase difference.

8. Angle-indicating means comprising a reference element having a plurality of uniformly spaced surfaces circularly disposed thereon, an angularly displaceable element having a plurality of uniformly spaced surfaces circularly disposed thereon, a rotating element having uniformly spaced surfaces circularly disposed thereon, said rotating element disposed in proximity to said reference element and said displaceable element, means for generating an electrical signal varying according to the amount of registration between said surfaces of said rotating element and said surfaces of said reference element, means for generating an electrical signal varying according to the amount of registration between said surfaces of said rotating element and said surfaces of said displaceable element, an oscillator, a first and second mixer connected to receive, respectively, said generated signals and mix them with the output of said oscillator to reduce said signals to a first and second intermediate frequency, a frequency standard, a phase detector connected to receive the output of said frequency standard and one of said intermediate frequencies and control the frequency of said oscillator whereby said intermediate frequency is fixed, means including a motor connected to receive said fixed intermediate frequency, a first optical disc arranged to be rotated by said motor, a second optical disc in juxtaposition with said first disc, light means adapted to pass light through said optical discs, said optical discs having areas of light transmissibility and nontransmissibility as said first optical disc rotates with respect to said second optical disc, a photoelectric cell adapted to receive light through said discs from said lamp, a phase sensitive detector connected to receive the output of said photoelectric cell and said other intermediate frequency, and means including a servo motor connected to receive the output of said last-mentioned phase sensitive detector.

9. The combination recited in claim 8 wherein said servo motor is connected to drive said second disc an amount determined by the output of said last-mentioned phase sensitive detector.

10. The combination recited in claim 8 wherein said servo motor is connected to drive said displaceable element an amount determined by the output of said last-mentioned phase sensitive detector.

11. An angle-measuring device comprising rotating disc means having a plurality of gratings inscribed thereon, stationary disc means coaxial with said rotating disc means and having a plurality of reference gratings inscribed thereon, a displaceable disc coaxial with said disc means and having a plurality of gratings inscribed thereon, said displaceable disc adapted to be rotatably displaced through an angle to be measured, a first light means adapted to pass light through said plurality of gratings on said rotating disc means and said plurality of gratings on said stationary disc means, a second light means adapted to pass light through said plurality of gratings on said rotating disc means and said plurality of gratings on said displaceable disc, photoelectric cells positioned with respect to said light means and said disc means whereby said cells receive the plurality of light rays passing through said plurality of gratings on said disc means, said photoelectric cells converting the pulsating light rays to pulsating electrical signals, electrical means to determine the phase difference of the electrical signals from said photoelectric cells.

12. Apparatus for measuring an angle comprising a light source, disc grating means, means to rotate said grating means, a first stationary disc coaxial with said disc grating, a second stationary disc adapted to be rotatively displaced with respect to said first disc an amount equal to the angle to be measured, said discs having a plurality of grating lines thereon, photoelectric cells, said disc grating means and said stationary discs being aligned with said light source and said cells to form a plurality of varying light pulses on said cells, said photoelectric cells converting the plurality of light pulses to pulsating electrical signals representing the sum of said plural light pulses, and means to determine the difference in phase between the electrical signals from the respective cells.

13. The invention of claim 12 in which the gratings are formed cylindrically around the edges of said disc grating and said stationary discs.

14. The invention of claim 12 in which the disc grating and stationary discs are flat-sided and the gratings are formed radially thereon.

15. An angle-measuring device comprising rotatable grating means, a first stationary grating means in juxtaposition to said rotatable grating means, a second stationary grating means in juxtaposition to said rotatable grating means and adapted to be rotated through an angular displacement, light means adapted to shine through each of said juxtaposed grating means, and a photoelectric means positioned to pick up light pulses from each of said first and second stationary grating means.

16. An angular measuring device comprising a rotatable element, a stationary reference element disposed in proximity to said rotatable element, means in combination with said rotatable element and said stationary reference element for simultaneously generating a plurality of pulse trains, the position of the pulses in said pulse trains being indicative of the position of said reference element, means for converting said plurality of pulse trains to a single pulse train representing the space averaged position of the reference element, an angularly displaceable element disposed in proximity to said rotatable element, means in combination with said rotatable element and said displaceable element for simultaneously generating a plurality of pulse trains, the position of the pulses in said latter pulse trains being indicative of the position of said displaceable element relative to said reference element, and means for converting said latter plurality of pulse trains to a single pulse train representing the space averaged position of the displaceable element relative to said reference element.

17. The angular measuring device recited in claim 16 wherein is included means for determining the phase difference between said pulse train representing the position of the reference element and said pulse train representing the position of said displaceable element.

18. An angular measuring device comprising a reference member having a plurality of spaced reference areas, means for simultaneously generating a plurality of pulses each of which is indicative of the angular spacing of different ones of said spaced reference areas on said reference member, means for converting said plurality of pulses to a single pulse representing the spaced averaged spacing of the plurality of reference areas on said reference members, a member angularly displaceable relative to said reference member having a plurality of spaced reference areas, means for simultaneously generating a plurality of pulses each of which is indicative of the angular spacing of different ones of said spaced reference areas on said angularly displaceable member, means for converting said plurality of pulses to a single pulse representing the spaced average spacing of the plurality of reference areas on said angularly displaceable member, and means for determining the phase difference between said pulses representing the space averaged spacing of the plurality of reference areas on said reference member and said pulse representing the space averaged spacing of the plurality of reference areas on said angularly displaceable member.

References Cited in the file of this patent

UNITED STATES PATENTS

| | | |
|---|---|---|
| 1,878,658 | Aranoff | Sept. 20, 1932 |
| 1,931,852 | Reichel | Oct. 24, 1933 |
| 2,042,831 | Crosby | June 2, 1936 |
| 2,256,482 | Isbister | Sept. 23, 1941 |
| 2,309,117 | John | Jan. 26, 1943 |
| 2,385,086 | D'Agostino et al. | Sept. 18, 1945 |
| 2,398,904 | Libman et al. | Apr. 23, 1946 |
| 2,422,074 | Bond | June 10, 1947 |
| 2,439,735 | Homrighous | Apr. 13, 1948 |
| 2,489,305 | McLennan | Nov. 29, 1949 |
| 2,524,361 | Sawyer | Oct. 3, 1950 |
| 2,656,106 | Stabler | Oct. 20, 1953 |
| 2,685,082 | Beman et al. | July 27, 1954 |
| 2,694,804 | Wagner | Nov. 16, 1954 |
| 2,717,987 | Hagen | Sept. 13, 1955 |
| 2,788,519 | Caldwell | Apr. 9, 1957 |
| 2,857,798 | Seliger | Oct. 28, 1958 |